(12) United States Patent
Gunderson et al.

(10) Patent No.: US 6,933,837 B2
(45) Date of Patent: Aug. 23, 2005

(54) TRAILER BASED COLLISION WARNING SYSTEM AND METHOD

(75) Inventors: Richard A. Gunderson, Eden Prairie, MN (US); David Thiede, Eden Prairie, MN (US)

(73) Assignee: Altra Technologies Incorporated, Watertown, MN (US)

( * ) Notice: Subject to any disclaimer, the term of this patent is extended or adjusted under 35 U.S.C. 154(b) by 42 days.

(21) Appl. No.: 10/056,640

(22) Filed: Jan. 25, 2002

(65) Prior Publication Data

US 2003/0141965 A1 Jul. 31, 2003

(51) Int. Cl.$^7$ .................................................. B60Q 1/00
(52) U.S. Cl. ...................... 340/436; 340/435; 340/903; 180/167; 180/169; 180/271; 180/274; 701/301
(58) Field of Search ................................. 340/901, 903, 340/436, 435, 437, 438, 441; 180/169, 274, 275, 282, 167, 271; 307/9.1, 10.1; 701/46, 48, 301, 45; 280/735, 423.1

(56) References Cited

U.S. PATENT DOCUMENTS

| | | | |
|---|---|---|---|
| 3,707,708 A | 12/1972 | Dan | 340/213.2 |
| 3,797,309 A | 3/1974 | Joy et al. | 73/194 B |
| 3,891,966 A | 6/1975 | Sztankay | 340/53 |
| 3,978,481 A | 8/1976 | Angwin et al. | 343/7 VM |

(Continued)

FOREIGN PATENT DOCUMENTS

| | | | |
|---|---|---|---|
| DE | 19702688 | 7/1998 | |
| DE | 197 02 688 | 7/1998 | B60R/16/02 |
| EP | 909959 A2 | 4/1999 | |
| EP | 0 909 959 | 4/1999 | G01S/13/93 |
| WO | WO-95/01890 | 1/1995 | B60Q/1/00 |
| WO | WO-99/42856 | 8/1999 | G01S/13/93 |

OTHER PUBLICATIONS

"Blind–Sight Collision Avoidance System", Blind–Sight Product Brochure,(1997).
"Driver's Manual for the CL–400 Reverse Parking Aid", TICI Software Systems Ltd. and Silcon Heights Ltd., Rechovot, Israel,(Jun. 1997),1–9.
"ECCO Scan Product Literature", (1996).
"Sonar Safety Systems Product Information", (1996).
Benites, E. , "A Demonstration of Multisensor Tracking", *Naval Weapons Center*, China Lake, CA, 307–311.
Blackman, Samuel S., "Multiple—Target Tracking with Radar Applications", Artech House, Inc., Norwood, MA,(1986),pp. 98–107, 368–381.

*Primary Examiner*—Davetta W. Goins
(74) *Attorney, Agent, or Firm*—Schwegman, Lundberg, Woessner & Kluth, P.A.

(57) ABSTRACT

A trailer based collision warning system includes one or more side object detection sensors, one or more backup assist sensors, a driver vehicle interface, and trailer-mounted display units operating essentially independent of the tractor with all detection and warning system equipment mounted on the trailer. The trailer based collision warning system is coupled to industry-standard tractor to trailer wiring to provide the trailer with power and signals such as left turn indication and right turn indication. The side and rear sensors detect the presence and location of objects and transfer this information to a driver vehicle interface device located on the trailer. The system can also be equipped with video cameras with a means of automatically activating the camera in the area where a hazard condition has been detected. The driver vehicle interface determines the nature of the information and/or warning needed by the driver and provides this information in the form of signals sent to displays that can to assist the driver in safely maneuvering the trailer. The collision warning system can also operate in a security mode.

30 Claims, 11 Drawing Sheets

U.S. PATENT DOCUMENTS

| | | | |
|---|---|---|---|
| 4,056,761 A | 11/1977 | Jacoby et al. | 318/116 |
| 4,072,945 A | 2/1978 | Katsumata et al. | 343/7 VM |
| 4,104,632 A | 8/1978 | Fujiki et al. | 343/7 VM |
| 4,125,826 A | 11/1978 | Rasmussen et al. | 340/63 |
| 4,146,891 A | 3/1979 | Fujiki et al. | 343/77 VM |
| 4,148,028 A | 4/1979 | Fujiki | 343/7 |
| 4,158,841 A | 6/1979 | Wuchner et al. | 343/7 VM |
| 4,162,488 A | 7/1979 | Silverman et al. | 340/505 |
| 4,204,096 A | 5/1980 | Barcus et al. | 179/146 R |
| 4,308,536 A | 12/1981 | Sims, Jr. et al. | 343/7 |
| 4,379,497 A | 4/1983 | Hainsworth et al. | 180/168 |
| RE31,509 E | 1/1984 | Neidell | 343/9 R |
| 4,489,321 A | 12/1984 | Hoffa et al. | 343/8 |
| 4,528,563 A | 7/1985 | Takeuchi | 340/903 |
| 4,537,271 A | 8/1985 | Ito et al. | 180/131 |
| 4,546,840 A | 10/1985 | Yukishige et al. | 180/169 |
| 4,580,251 A | 4/1986 | Koukovinis | 367/140 |
| 4,612,530 A | 9/1986 | Kurth | 340/63 |
| 4,679,175 A | 7/1987 | Eder et al. | 367/98 |
| 4,681,431 A | 7/1987 | Sims et al. | 356/4 |
| 4,692,764 A | 9/1987 | Bonar | 342/71 |
| 4,737,788 A | 4/1988 | Kennedy | 342/29 |
| 4,759,063 A | 7/1988 | Chaum | 380/30 |
| 4,759,064 A | 7/1988 | Chaum | 380/30 |
| 4,815,046 A | 3/1989 | Dorr | 367/95 |
| 4,823,042 A | 4/1989 | Coffey et al. | 310/322 |
| 4,920,520 A | 4/1990 | Gobel et al. | 367/99 |
| 4,943,796 A | 7/1990 | Lee | 340/435 |
| 4,953,141 A | 8/1990 | Novak et al. | 367/108 |
| 5,029,290 A | 7/1991 | Parsons et al. | 340/533 |
| 5,059,946 A | 10/1991 | Hollowbush | 340/435 |
| 5,091,726 A | 2/1992 | Shyu | 340/904 |
| 5,153,559 A | 10/1992 | Atsumi | 340/435 |
| 5,181,011 A | 1/1993 | Okano | 340/438 |
| 5,212,467 A | 5/1993 | Park | 340/435 |
| 5,229,975 A | 7/1993 | Truesdell et al. | 367/107 |
| 5,235,316 A | 8/1993 | Qualizza | 340/436 |
| 5,249,163 A | 9/1993 | Erickson | 367/149 |
| 5,251,188 A | 10/1993 | Parsons et al. | 367/140 |
| 5,286,099 A | 2/1994 | Fujita et al. | 303/103 |
| RE34,773 E | 11/1994 | Dombrowski | 340/904 |
| 5,373,482 A | 12/1994 | Gauthier | 367/99 |
| 5,389,912 A | 2/1995 | Arvin | 340/435 |
| 5,418,359 A | 5/1995 | Juds et al. | 250/221 |
| 5,424,747 A | 6/1995 | Chazelas et al. | 342/70 |
| 5,455,557 A | 10/1995 | Noll et al. | 340/431 |
| 5,465,079 A | 11/1995 | Bouchard et al. | 340/576 |
| 5,471,215 A | 11/1995 | Fukuhara | 342/70 |
| 5,483,501 A | 1/1996 | Park et al. | 367/140 |
| 5,485,892 A | 1/1996 | Fujita | 180/167 |
| 5,517,197 A | 5/1996 | Algeo et al. | 342/70 |
| 5,528,217 A * | 6/1996 | Adams | 340/435 |
| 5,541,891 A | 7/1996 | Waldmann et al. | 367/99 |
| 5,572,428 A | 11/1996 | Ishida et al. | 364/461 |
| 5,574,426 A | 11/1996 | Shisgal et al. | 340/435 |
| 5,581,464 A | 12/1996 | Woll et al. | 364/424.04 |
| 5,583,479 A | 12/1996 | Hettich et al. | 340/426 |
| 5,587,938 A | 12/1996 | Hoetzel | 364/578 |
| 5,635,922 A | 6/1997 | Cho et al. | 340/903 |
| 5,668,739 A | 9/1997 | League et al. | |
| 5,670,935 A | 9/1997 | Schofield et al. | 340/461 |
| 5,684,474 A | 11/1997 | Gilon et al. | 340/903 |
| 5,712,640 A | 1/1998 | Andou et al. | 342/70 |
| 5,714,928 A | 2/1998 | Sudo et al. | 340/436 |
| 5,714,947 A | 2/1998 | Richardson et al. | 340/903 |
| 5,734,336 A * | 3/1998 | Smithline | 340/903 |
| 5,749,984 A | 5/1998 | Frey et al. | 152/415 |
| 5,767,793 A | 6/1998 | Agravante et al. | 340/903 |
| 5,825,286 A * | 10/1998 | Coulthard | 340/447 |
| 5,905,433 A * | 5/1999 | Wortham | 340/431 |
| 5,917,666 A | 6/1999 | Kimble | 359/838 |
| 5,929,786 A | 7/1999 | Schofield et al. | 340/903 |
| 6,154,149 A | 11/2000 | Tyckowski et al. | 340/903 |
| 6,184,781 B1 | 2/2001 | Ramakesavan | 340/435 |
| 6,198,409 B1 | 3/2001 | Schofield et al. | 340/903 |
| 6,225,918 B1 * | 5/2001 | Kam | 340/903 |
| 6,250,783 B1 | 6/2001 | Stidham et al. | 362/494 |
| 6,339,369 B1 * | 1/2002 | Paranjpe | 340/436 |
| 6,421,081 B1 * | 7/2002 | Markus | 340/436 |

\* cited by examiner

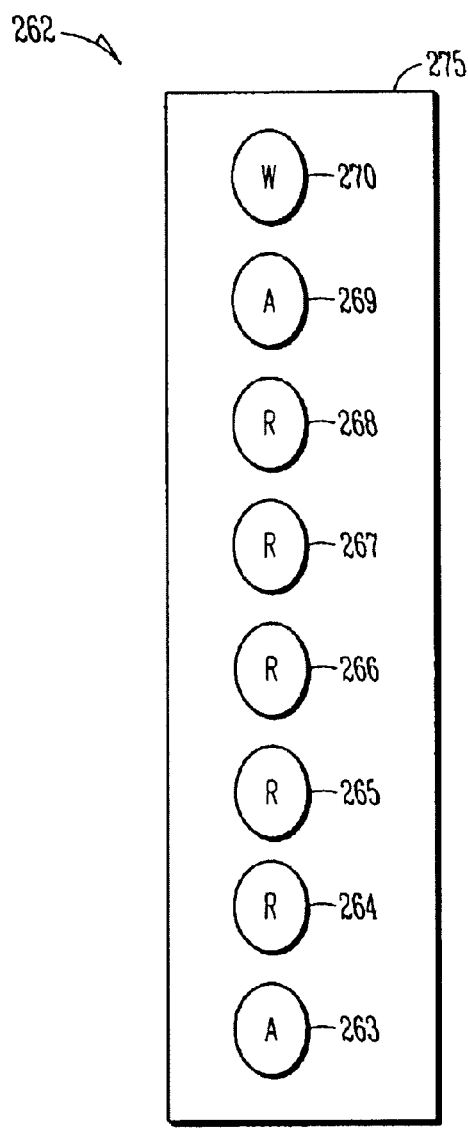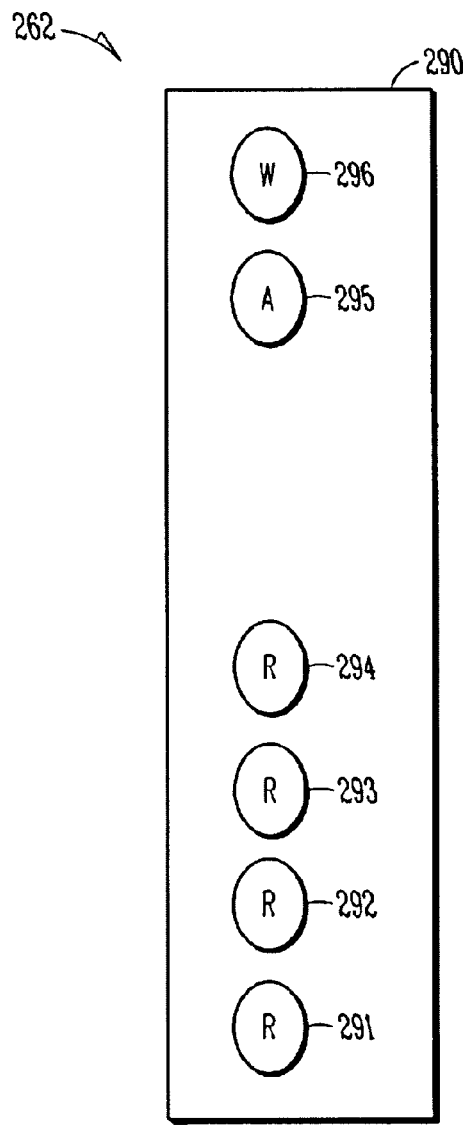
*FIG. 5*     *FIG. 6*

TRAILER BASED COLLISION WARNING SYSTEM AND METHOD

TECHNICAL FIELD OF THE INVENTION

The present invention relates generally to sensor based systems, and more particularly to a vehicle mounted collision avoidance system, which warns drivers of potential collisions.

BACKGROUND OF THE INVENTION

High traffic loads fill today's roads and highways with a wide variety of vehicle types. Maintaining vehicle safety on these roads is of paramount importance. Two particular problems in maintaining safety is the size differentials among the wide variety of vehicle types and the poor visibility drivers experience due to the inherent design of the larger vehicles. Motorcycles and passenger vehicles are much smaller than the trucks that use the same roads. Large trucks have significant blind spots in which they cannot see other vehicles. Attempts have been made to educate the public on the NO-ZONE of blinds spots around a large truck. Regardless, accidents often occur during the operation of large trucks on rural and urban roads. Providing large trucks with collision warning systems has the potential of greatly reducing accidents, injuries, and deaths.

Sonar Safety Systems of Santa Fe Springs, Calif. has a rear-mounted ultrasonic sensor system that detects objects behind the vehicle while backing up. Objects are detected within three distance zones from the rear of the vehicle. When an object is detected in one of the zones, audible and visual feedback is provided to the driver. The detection zones generally cover areas within ten (10) feet of the rear of the vehicle. This system is limited in that it is designed for single chassis vehicles up to and including commercial straight trucks. It requires the processing unit and display to be inside the cab of the vehicle. It does not address the needs of combination tractor trailer rigs and does not provide any side collision warning capability.

Transportation Safety Technologies of Indianapolis, Ind. has an ultrasonic sensor system that is designed to incorporate up to seven sensors to monitor the areas on the sides and rear of a vehicle. In the case of a combination tractor trailer rig, it can monitor the sides of a tractor, the sides of trailers, and the rear of a trailer. Driver feedback is provided through a Driver Alert Module located in the cab of the vehicle. This system has limitations in that it is limited to a maximum of seven sensors and the tractor and trailer both need to be equipped with the Transportation Safety Technologies product. If the tractor is so equipped and the trailer is not, the system is limited to monitor the blind spots on the sides of the tractor with no protection around the trailer. If the trailer is equipped with this system and the tractor is not, the trailer sensors are useless since they rely on the Driver Alert Module in the tractor of the combination tractor-trailer rig. In this case there is no collision warning detection at all.

The combination tractor-trailer rig presents a unique set of problems not previously addressed by manufacturers of collision warning systems. These problems include the following: (a) previous collision warning systems required electronic devices and feedback mechanisms to be installed on or in the tractor, (b) the company that provides the tractor is often different from the company that owns the trailer, (c) there are three times as many trailers in the marketplace as there are tractors, and (d) one tractor may pull many different trailers during the course of a day, week, month, or year. In cases where a tractor is equipped with a collision warning system, in most cases that tractor is not pulling a trailer equipped with a collision warning system. In cases where a trailer fleet owner is interested in implementing collision warning on their trailers, they can't be assured that the independent owner-operators that they hire to pull the company's trailers will be using tractors equipped with a collision warning system.

Trailers are equipped with brake lights to warn vehicles traveling in close proximity behind the trailer that the trailer is slowing down. However, truck drivers often use the engine and transmission to slow down the vehicle without activation of the brakes. This takes away the benefits of brake lights as a visual warning for drivers of other vehicles. A means is needed to warn drivers of other vehicles that the trailer is slowing down.

Tandem trailers (i.e. two trailers pulled behind a single tractor) also present a unique set of problems. To-date there has not been a collision warning solution for tandem-trailers. A trailer-based collision warning system needs to address this unique set of needs.

Since the rear of trailers, and to a lesser extent the sides of the trailer, present a major blind spot to the driver, improvements in combination tractor-trailer safety will be limited unless a means is found to provide automatic hazard detection and collision warning on the trailer independent of the tractor pulling the trailer and to provide a means of communicating visual alarms, audible alarms, and video information to the driver.

Another trailer issue that requires attention is the theft of goods and the hijacking of trailers. A means is needed to detect unauthorized access to a trailer and unauthorized access to fluids stored in tankers. In addition there is a need to detect hijacking of trailers. In addition to the need to detect these security violations there needs to be a means of scaring away the thieves and/or providing an alert to police or the trailer fleet owner.

SUMMARY OF THE INVENTION

The present invention includes a system that overcomes the previously described problem by providing an independent self-contained collision warning system on a trailer. A trailer based collision warning system includes side object detection sensors, backup assist sensors, a driver vehicle interface, and a trailer side display. The trailer based collision warning system operates essentially independent of the tractor with all essential system equipment mounted on the trailer. Most trailers on the market today contain a seven-wire cable that plugs into the tractor. This cable generally includes power, turn signal indicators, and running light/marker light/brake light power. Newer systems are equipped with nine or more wires including a data bus interconnecting the tractor and trailer. The trailer based collision warning system uses the power and turn signal indicators. The system can incorporate data from future vehicle data bus structures. The side and rear sensors detect the presence of an object that could result in a collision, and provide this information to the driver vehicle interface. The driver vehicle interface determines the level of warning necessary, and provides signals to the displays, which provides a warning indication to the driver of a possible collision hazard.

In another embodiment of the present invention, visual warning is provided regarding side object and/or rear object detection including activating a display in a set pattern that is visible through the side view mirrors. The display includes an array of lights whose pattern of activation provides proximity hazard information. The display includes information regarding status, object range, and object direction, distinguishing side object detection, and rear object detection.

In another embodiment of the present invention, information signals are superimposed on existing battery power wires providing signals for audible use by external systems. The information signals are superimposed on the battery wire providing access by an audio device adapted for use in a vehicle cigarette lighter outlet or a vehicle auxiliary power outlet.

In another embodiment of the present invention, information signals for external audible use are transmitted using wireless technology. The information signals contain information provided by object detection sensors.

In another embodiment of the present invention, a portable audio receiver is adapted to receive audio signals superimposed on the battery wire. The portable audio receiver is further adapted for use with a tractor cigarette lighter outlet or vehicle auxiliary power outlet, generally associated with the tractor pulling the trailer. The low cost and portability of the portable audio receiver make it practical to provide for each tractor hired to pull the trailer.

In another embodiment of the present invention, information signals are superimposed on the battery wire providing signals for audible and visual feedback by external systems mounted in the cab of the vehicle. In another embodiment of the present invention, signals are transmitted by wireless technology for audible and visual feedback by external systems mounted in the cab of the vehicle.

In another embodiment of the present invention, at least one sensor is mounted on an axle or hub on a trailer for detecting direction of motion. The direction information is supplied to a driver vehicle interface for processing. Based on the driver vehicle interface processing, signals are provided to one or more displays.

In another embodiment of the present invention, a method for recording data pertinent to driver performance, vehicle condition, and/or data pertinent to a collision includes recording vehicle status and collision warning sensor data, associating a time with the data, and providing a "record stop" signal that can be activated as a result of a collision.

In another embodiment of the present invention, a wireless communications system includes a processor, memory, a transmitter, and a receiver. The transmitter sends status information related to the trailer to a land-based terminal for access by the trailer fleet owner. The receiver accepts commands from the land-based terminal to request the wireless communications system and/or the collision warning system to take specific pre-programmed actions.

In another embodiment of the present invention, a means for providing trailer security includes apparatus and/or software for activating a security mode, activating collision warning sensors (representing one or more technologies) to detect motion of the trailer or motion of objects in vicinity of the trailer, detecting the opening of trailer doors, and/or detecting the opening of valves on a tanker. If a security violation is detected, a security audible alarm is sounded and/or a message is sent over the wireless communication system to provide warning of a security violation in process.

In another embodiment of the present invention, a driver vehicle interface is configured on each of two trailers coupled as tandem trailers being pulled by a single tractor. Each driver vehicle interface is coupled to sensors providing side object detection (on both trailers) and/or sensors providing rear object detection (only required on rear-most trailer). The two driver vehicle interfaces are coupled together to provide status information externally by activating a display in an appropriate manner based on the status information.

In another embodiment of the present invention, a set of video cameras are used to monitor areas to the sides and rear of the trailer. The video cameras are connected to the collision warning system and to a video switch with a wireless link to the cab of a tractor. The video switch is controlled by the collision warning system to activate the video camera in the area of a detected hazard condition.

In another embodiment of the present invention, the trailer-based system detects that the trailer is slowing down and the system automatically activates the trailer brake lights. This is necessary because tractors often use the engine and transmission to slow down the vehicle without activation of the brake. This presents a hazardous condition for vehicles driving in close proximity to the rear of the trailer resulting in them running into the back of the trailer.

BRIEF DESCRIPTION OF THE DRAWING

FIG. 5 depicts a view of a trailer mounted display, in accordance with the present invention.

FIG. 6 depicts a trailer mounted display having six LEDs mounted on a vertical strip, in accordance with the present invention.

DESCRIPTION OF THE PREFERRED EMBODIMENTS

Figure 1:
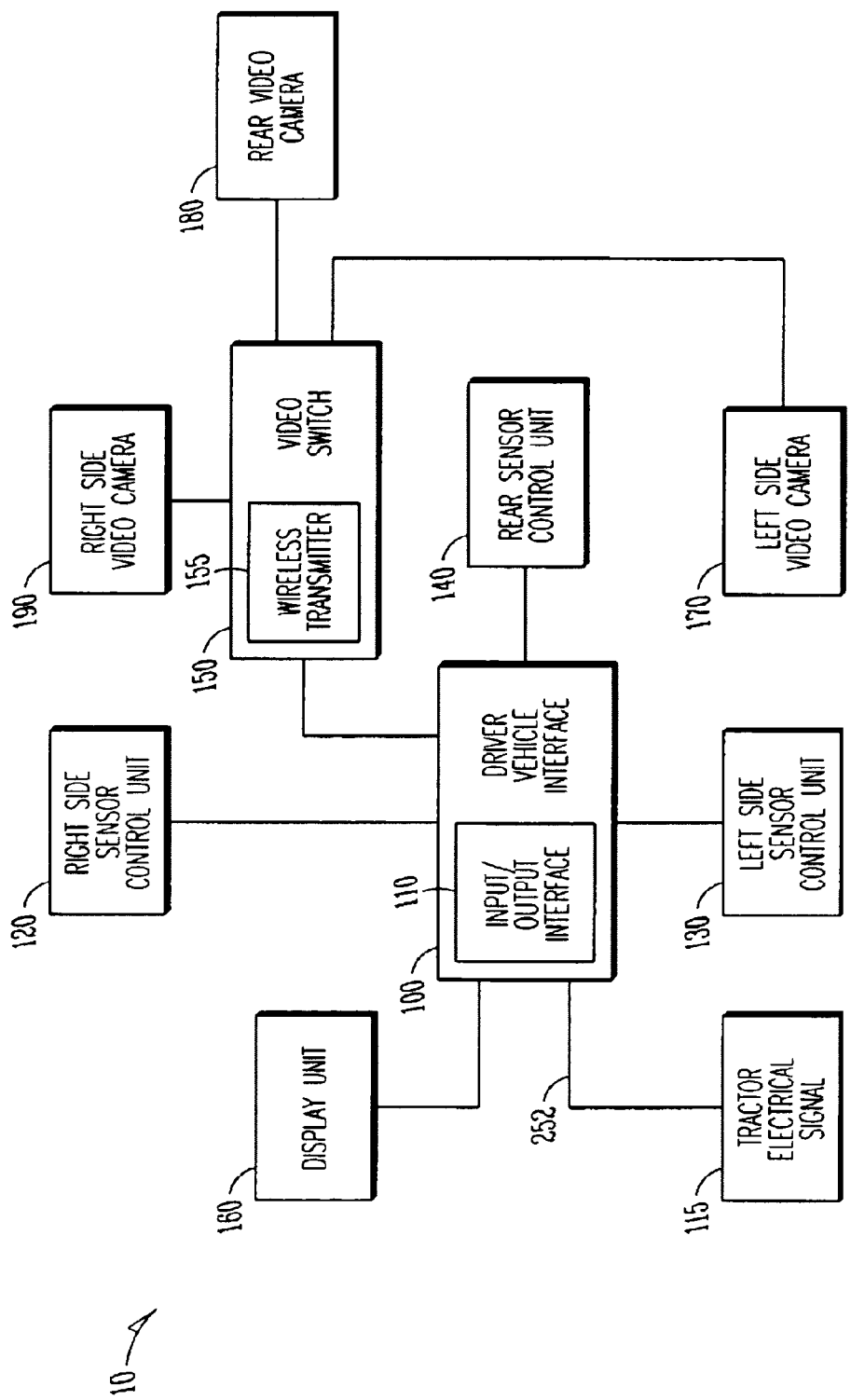
FIG. 1 is a block diagram of a trailer based collision warning system depicting elements of the trailer warning system, in accordance with the present invention.

In the following detailed description of the preferred embodiments, reference is made to the accompanying drawings, which form a part hereof, and in which is shown by way of illustration specific preferred embodiments in which the invention may be practiced. In the drawings, like numerals describe substantially similar components throughout the several views. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims and their equivalents.

FIG. 1 shows a block diagram for the functional units of a trailer based collision warning system 10. In an embodiment of the present invention, objects are detected on the two sides and rear of the trailer using right side sensor control unit 120, left side sensor control unit 130, and rear sensor control unit 140. These sensor control units communicate the detection results to a driver vehicle interface (hereafter DVI) 100 that controls one or two display units 160 that communicate visual and audio information to the driver or to an input/output interface 110 that sends information to other devices external to the collision warning system 10. The sensor control units 120, 130, 140 control a plurality of sensors, as will be discussed in further detail below. DVI 100 includes an input/output unit 110 that receives power and signals, as well as providing output signals. DVI 100 is coupled to tractor electrical signals 115 by cable 252 to receive such signals as turn signals, battery power, brake light controls, and other lighting controls. Advantageously, the trailer based collision warning system essentially operates independent of the tractor with all essential equipment that is comprised in the trailer based collision warning system 10 mounted on the trailer. Though DVI 100 receives power and signals from outside the tractor, no significant modification to the tractor needs to be implemented for mounting and using the trailer based collision warning system. The power and signals to DVI 100 use existing standardized cabling, which allows any trailer having a trailer based collision warning system to be used with any corresponding tractor that adheres to the standards set for coupling a tractor and a trailer. Further, display unit 160, which is mounted to the trailer, communicates hazard information to a driver without the need for additional wiring between the tractor and trailer.

FIG. 1 also depicts the optional feature of mounting multiple video cameras, such as right side video camera 190, left side video camera 170, and rear video camera 180, around the periphery of the trailer as a means of giving the driver a "visual picture" of the area in which a hazard condition exists. A video switch 150 is controlled by DVI 100 to select a video camera based on detection of a hazard condition in a particular area around the trailer. Signals from the selected camera are converted to wireless form to be transmitted to the tractor for display to a driver using a wireless transmitter 155 within the video switch 150.

Figure 2:
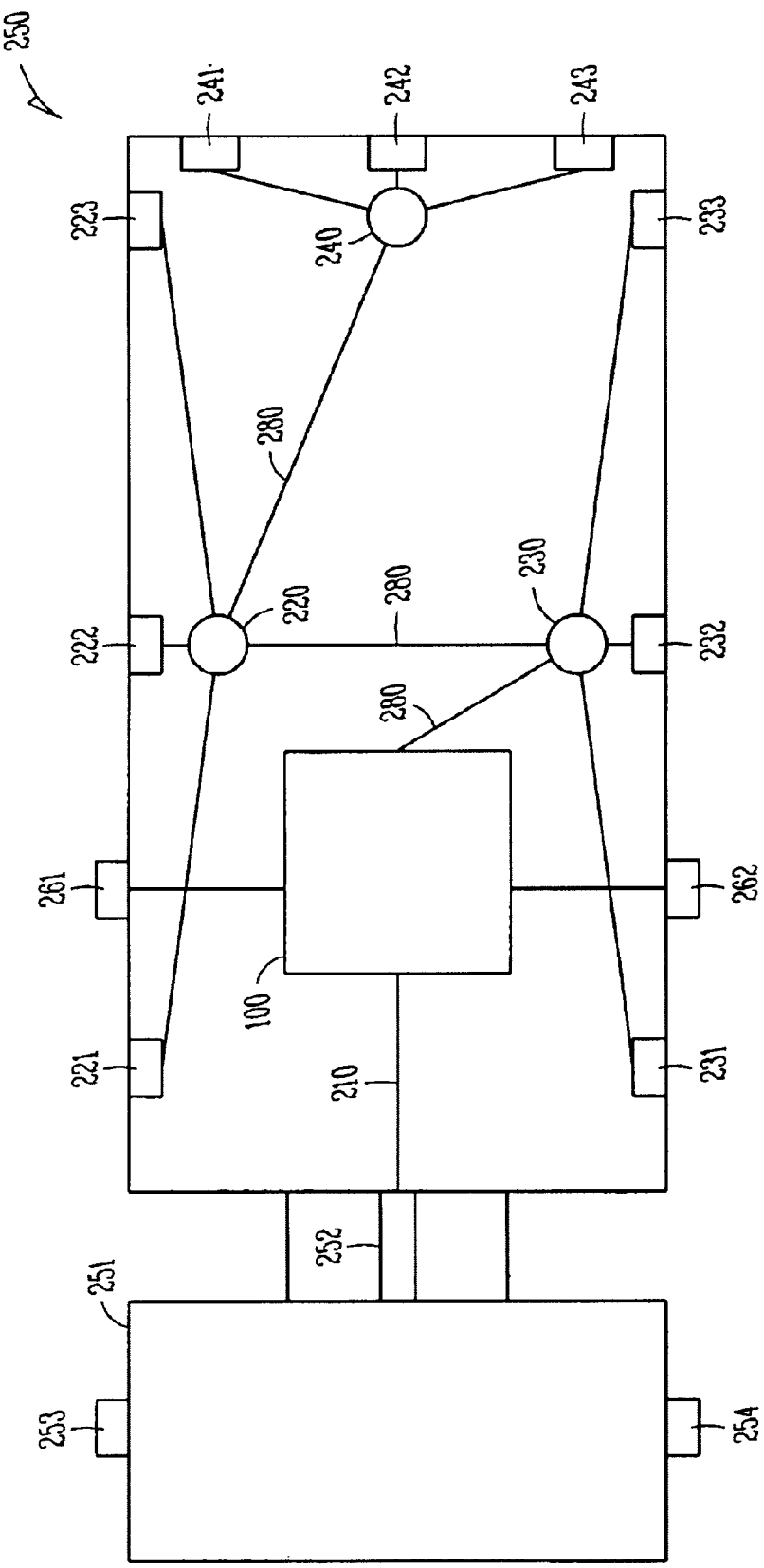
FIG. 2 depicts the mounting of a trailer based collision warning system on a trailer essentially independent of a tractor to which the trailer is coupled, in accordance with the present invention.

FIG. 2 depicts the mounting of the trailer based collision warning system 10 to a trailer 250. DVI 100 is coupled to the standard seven wire cable 252 with lines 210 for receiving power and signals, such as turn signals, battery power, brake light controls, and other lighting controls. DVI 100 is also coupled to the sensor control units using a daisy chain bus system 280, providing networking of information. The right side sensor control unit 120, left side sensor control unit 130, and rear sensor control unit 140, all of FIG. 1, control a plurality of sensors. Sensor control units 120, 130, 140 are labeled as 220, 230, 240, respectively, in FIG. 2. DVI 100 is coupled by the bus system 280 to the left side sensor control unit 230. The sensor control unit 230 controls sensors 231–233. The sensor control unit 230 is coupled via the bus system 280 to the sensor control unit 220. The sensor control unit 220 controls sensors 221–223. The sensor control unit 220 is coupled via bus system 280 to the rear sensor control unit 240. The control unit 240 controls sensors 241–243.

The bus system 280 is a standard interface in accordance with RS 485 serial link standard. The bus system 280 provides power and data for the components of the trailer based collision warning system. Alternately, a Controller Area Network (hereafter CAN) bus can be used as bus system 280.

In accordance with the present invention, the sensor control units 220, 230, and 240 may be continually transmitting and receiving signals as long as the trailer is connected to an operating tractor, or selectively turned on and off by the controller. The sensors controlled by sensor control units 220, 230, 240 are operating to detect the presence of an object within their field of view (FOV) having a set range. The set of sensors can include various technologies among which are radar, ladar, ultrasonic, infrared, video, and laser sensors. Each sensor technology has its own advantage and disadvantage and for that reason each sensor control unit may be connected to sensors of more than one technology to achieve superior performance and reliability.

Figure 3:
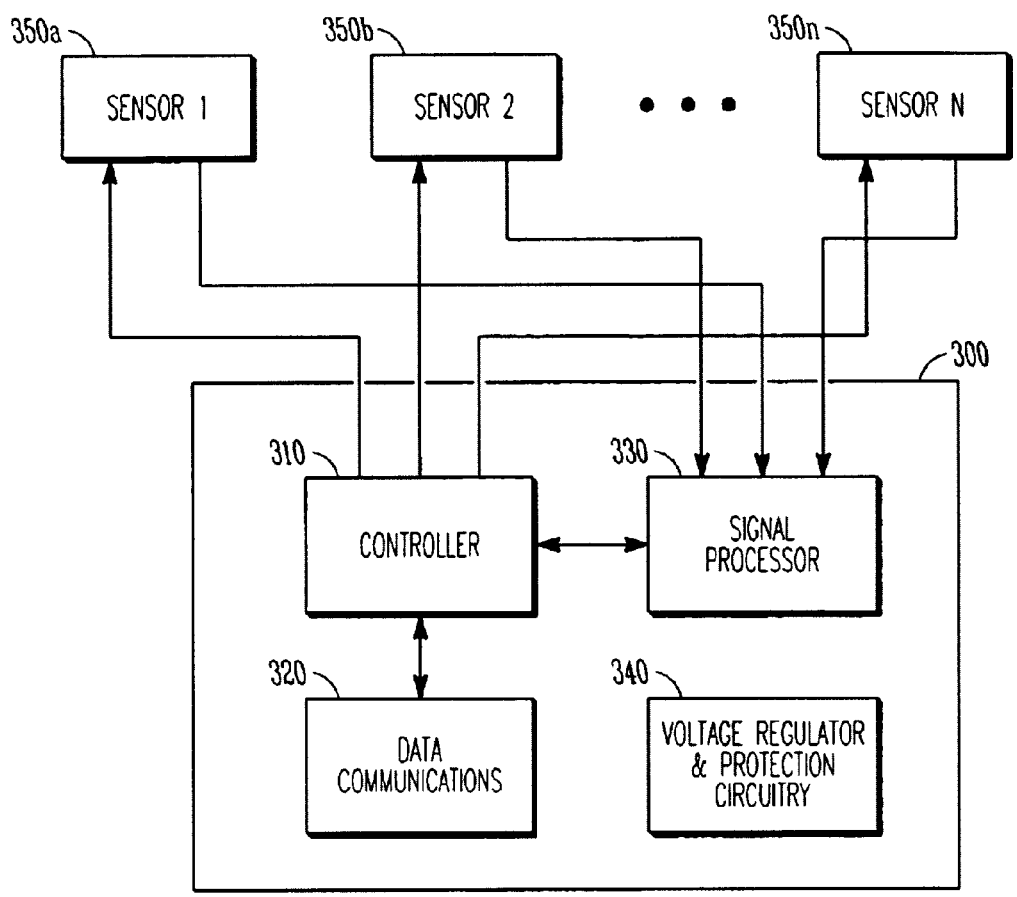
FIG. 3 is a block diagram of a sensor control unit depicting elements for controlling sensors, signal processing, data communications, and for voltage regulation.

FIG. 3 shows a block diagram of a sensor control unit depicting elements for controlling sensors, signal processing, data communications, and for voltage regulation. A sensor control unit 300, which is typical of sensor control units 220, 230, 240, includes controller 310, signal processor 330, data communications 320, and voltage regulator and protection circuitry 340. Controller 310 controls multiple sensors 350a–n, where each sensor has a receiver and a transmitter. Further, multiple sensors 350a–n may include sensors of varying technology types such as radar, ultrasonic, laser, and infrared, among others. Signal processor 330 uses information from sensors 350a–350n to determine relative presence of a hazard. Information is provided by sensor control unit to external units by data communications 320. Further, voltage regulator and protection circuitry 340 maintains sensor control unit 300 in proper operating ranges. Further details of the utilization of a sensor control unit in the trailer based collision warning system will be provided in later discussions concerning sensor control units 220, 230, 240.

In an embodiment of the present invention, a hybrid configuration of sensor types is used in conjunction with a sensor control unit, where each sensor type operates to detect an object within a set distance from the trailer. This hybrid configuration includes radar-sensors and ultrasonic sensors, where three sensors are used with a sensor control unit.

The detection signals are supplied from each sensor control unit 220, 230, 240 to DVI 100. The presence of an object is communicated to a driver by activating a display unit 160 of FIG. 1. The display unit 160 can include a set of visual and audio means for communicating information to a driver. FIG. 2 illustrates two trailer mount displays 261, 262 as part of display unit 160, one mounted on each side of the trailer 250. The trailer mount displays include a set of vertical lights which when activated indicate to the driver the presence of an object. The set of lights provides information on system status, direction (left side or right side), and relative distance of the detected object from the trailer. Significantly, the warning information is provided to the driver without relying on electronics in the tractor.

In FIG. 2, the driver in tractor 251 can view in mirror 253 information displayed on trailer mounted display 261 when turn signals are active in the process of changing lanes or turning a corner or when the vehicle is backing up. Likewise, the driver in tractor 251 can view in mirror 254 information displayed on trailer mounted display 262 when turn signals are active in the process of changing lanes or turning a corner or when the vehicle is backing up. Ambient light sensors built into trailer mounted display 261 and 262 provide input to DVI 100 such that it can control the intensity of the indicators in the trailer mounted displays to compensate for variations in outdoor light levels. Further details of the components and alternate embodiments will be provided in the discussions that follow.

DVI 100 controls the communication of hazard information to a driver of tractor 251. DVI 100 operates from 12, 24, or 42 VDC vehicle battery power with protection circuits to protect the electronics from surges due to an overcharging alternator, reverse voltage, electrostatic discharge, or noise on the battery power wires. It also provides a system fuse or breaker. The housing of DVI 100 effectively seals against all environmental conditions, solvents, and sprays encountered on the exterior of a vehicle per SAE J1455, and complies with SAE J1455 and with FCC requirements. Further, DVI 100 is connectorized. Connectors utilize a locking mechanism, are environmentally sealed, and provide highly reliable electrical connections under continuous shock and vibration. DVI 100 mounts on a flat surface, typically under the trailer or inside the trailer, utilizing screws inserted from the front of DVI 100. Other mounting arrangements can be used for the specific needs of a particular vehicle.

DVI 100 interfaces with two trailer mounted displays 261, 262 providing identical information to the left display 262 and to the right display 261, regardless of whether or not a driver in tractor 251 can view both displays 261, 262 in the tractor mirrors 253, 254. For example, when turning right, there will be a period of time when the left display 262 can not be viewed in left mirror 254, but the lights of display 262 will be activated if objects are detected. DVI 100 provides the information to the displays 261, 262 using information from sensor control units mounted on the trailer, and left turn and right turn signal information received from the lines 210 coupled to the trailer through the cable 252 from tractor 251. DVI 100 also includes a programmable option to detect that the 4-way flashers are on indicating that the trailer is in reverse. Further, DVI 100 is designed such that the data bus 280 can be configured for RS485 or CAN and can be provided with an optional interface to a J1939 vehicle data bus. Firmware resident in the DVI and sensor assemblies 220, 230, and 240 can be easily upgraded at time of installation as well as after installation.

The trailer based collision warning system is activated by the ignition switch in the tractor. Built-in test functions are performed by the DVI and all sensor control units when power is initially applied. Built-in test functions continue to be performed as the system is running to detect any sensor failures, processor failures, or data communications failures. DVI 100 is compatible with the built-in test functions provided by each sensor control unit, such as 230, and each sensor such that malfunctions are detected and reported. DVI 100 provides visual and audio indications that it is fully functional when the trailer based collision warning system 10 is powered up. The visual indication is provided by activating all lights in the visual displays 261, 262. If an optional external audio device is installed, the built-in test function will activate the audio unit with a pleasant tone if the built-in test results are positive. If a power-up build-in-test (BIT) detects a system failure, the audio unit will be activated in a less pleasant distinctive manner. DVI 100 operates in conjunction with the sensor control units to coordinate, from the trailer 250, communication of information to a driver of tractor 251, both audibly and visually.

The volume of the audio function may be programmed with a fixed sound level or may be equipped with an automatic volume control to adjust the sound level to a level louder than the background noise in the cab of the vehicle. In one embodiment described later in this document, an audio device mounted in the tractor receives audio information from the trailer using power line carrier technology. In another embodiment described later in this document, an audio device mounted in the tractor receives audio information from the trailer using wireless technology.

Audible Feedback Table

| | |
|---|---|
| Rear detection range greater than 25' | No audible feedback |
| Rear detection in range of 12' to 25' | Single audible pulse at the time the object is first detected |
| Rear detection in range of 8' to 12' | One audible pulse every two seconds |
| Rear detection in range of 3' to 8' | One audible pulse every second |
| Rear detection in range of 2' to 3' | Two audible pulses every second |
| Rear detection in range of 1' to 2' | Four audible pulses every second |
| Rear detection in range less than 1' | Steady audible tone squelched after 5 seconds |
| Sudden change in the range to object behind the vehicle (as might be expected if a person or vehicle were to suddenly move in behind the vehicle) | Steady audible tone, squelched after 5 seconds |
| Built-in test malfunction | Four audible pulses per second for a period of one second, than a one second delay, and then a second burst of four audible pulses per second for a period of one second, then no audible alarm |
| Object detected within 8 feet to the side of the vehicle while moving forward | Two short pulses if left or right turn signal is active |
| Object detected within a programmable range of 6' to 2' to the side of the vehicle while the vehicle is backing up | Two short pulses if left or right turn signal is active |
| Built-in test pass condition | A two second tone presented when built-in test is performed at the time power is applied to the system |

Hazard definition and audible alarm indicators are programmable. The above table represents default parameters that can be easily changed to suit the needs of a specific application or a specific customer.

Each sensor control unit 220, 230, 240 shown in FIG. 2 is coupled to three sensors. The sensor control units are similar to the type A unit that is described in "System and Method for Warning of Potential Collisions," U.S. patent application Ser. No. 09/621,748, filed Jul. 21, 2000, assigned to the assignee of the present invention, and incorporated herein by reference. Furthermore, a stand-alone smart sensor is described in "System and Method of Providing Scalable Sensor Systems Based on Stand Alone Sensor Modules," U.S. patent application Ser. No. 09/505,418, filed Feb. 16, 2000, assigned to the present signee, and incorporated herein by reference.

In an embodiment of the present invention, the sensor control units consist of a combination of radar-based sensors units and ultrasonic-based sensors. These sensors operate from 12 VDC vehicle battery power, with protection circuits to protect the electronics from surges due to an overcharging alternator, reverse voltage, or electrostatic discharge. The sensors are certified to comply with SAE J1455 and with FCC requirements. The sensor housings effectively seal against all environmental conditions, solvents, and sprays encountered on the exterior of a vehicle per SAE J1455, and are connectorized. Connectors utilize a locking mechanism, are environmentally sealed, and provide highly reliable electrical connections under continuous shock and vibration. The sensor configurations work effectively in clear weather, fog, rain, snow, and sleet over an operating temperature range from about −40° C. to +85° C. The sensor configurations provide a built-in-test function that detects a malfunction in any of the sensors.

The rear sensor control unit comprises two ultrasonic sensors 241, 243, and one radar sensor 242. The right side sensor control unit and the left side sensor control unit both comprise three radar sensors. It can be understood by those skilled in the art that the configuration of the sensor control units can be modified for the appropriate application of the trailer based collision warning system 10. The radar sensor 242 responds sufficiently fast such that a valid detection is communicated via displays 261, 262 within a fraction of a second of the aforementioned object detection. Further, ultrasonic sensors 241, 243 as well as radar sensor 242 will detect a sudden change in range for objects with radar cross section equal to or larger than a small child (30" tall) within 10' of the rear of the trailer. The change is communicated to the driver as a hazard condition via displays 261, 262 within a fraction of a second of the change.

The ultrasonic sensors 241, 243 coupled to the rear sensor control unit 240 measure the range to any object equal to or larger than 1" diameter pipe 3' long at a range of 6" to 12' behind the trailer with an accuracy of +/−10% or +/−2" (whichever is greater) over the full operating temperature range. Further the ultrasonic sensor measures the range to a chain link fence at a range of 6" to 8' with an accuracy of +/−10% or +/−3" (whichever is greater) over the full operating range. Within these specified ranges, the ultrasonic range measurement tracks the actual range for trailer speeds up to 5 mph. For trailer speeds over 5 mph to 15 mph, the range measurement tracks actual range within 20%.

Each sensor control unit 220, 230, and 240, can be programmed in the field during installation to indicate a mounting position and to set variable thresholds for the sensors connected to it. Each sensor control unit can support up to three radar sensors and three ultrasonic sensors. As an option, each sensor control unit can synchronize sample times on all radar sensors on a vehicle so all radar sensors are off long enough to pulse the output of all the radar sensors on and off.

Each sensor control unit provides, via a RS485 serial link, alarm sensor controlled alarm on/off messages to DVI 100 based on its own radar data and ultrasonic data. DVI 100 operates with the information from sensor control units 220, 230, 240 to activate the visual displays 261, 262. DVI 100 in conjunction with rear sensor control unit 240 will not provide alarm condition or range measurement information via the visual displays 261, 262 when the tractor-trailer 251–250 is first shifted into reverse, unless valid object detection has occurred. For alarms based on rear sensor data, once an object is detected and an alarm or range condition is visually presented to the driver, the alarm and range condition continue to be presented visually unless the object has been removed from the rear of the vehicle, or the transmission is shifted out of reverse. All alarms and range measurement are extinguished within 1 second of when the alarm clearing event occurs.

In hybrid configurations using radar sensors and ultrasonic sensors, if the radar sensors determine that the vehicle is in close proximity to an object, but there is no range information from the ultrasonic sensors, or if a malfunction is detected in the ultrasonic sensors, the radar data will override the ultrasonic sensor data and provide range information that is communicated to a driver via the visual displays 261, 262. When sensor control unit 240 is configured with two ultrasonic sensors 241, 243, a triangulation algorithm may be used to calculate actual range to the object based on programmed spacing of the ultrasonic sensors. The default setting for the ultrasonic sensors is seven feet. Such triangulation is described in "Precision Measuring Collision Avoidance," U.S. patent application Ser. No. 09/587,244, filed Jun. 2, 2000, assigned to the present assignee, and is incorporated herein by reference.

For rear object sensing, range indications are only displayed when the range drops below 25 feet. When an object is detected within 25 feet, the range continues to be displayed as long as the transmission is in reverse or the four-way flasher is active.

For alarms based on side sensor data, an alarm condition is not presented to the driver when a turn signal is first activated unless a valid hazard condition exists at that time. Once a valid hazard is detected, the visual warning presented on visual displays 261, 262 continues without interruption until the hazard has passed.

Figure 4:
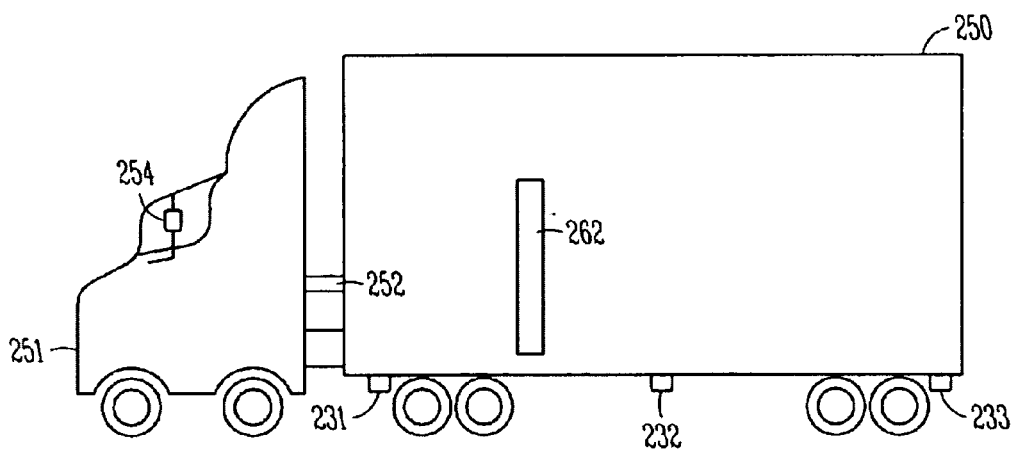
FIG. 4 depicts a view of the left side of a tractor-trailer indicating the mounting of a display on the left side of the trailer in relation to the left side-view mirror of the tractor, in accordance with the present invention.

FIG. 4 depicts the location of trailer mounted display 262 on the left side of the trailer 250. The trailer mounted display 262 is visible to a driver in the tractor 251 using mirror 254 to view the left side of the tractor-trailer 251–250.

FIG. 5 provides a view of a trailer mounted display in accordance with the present invention. The trailer mounted display 262 and the trailer mounted display 261 are identical with display 261 mounted on the right side of trailer 250 and display 262 mounted on the left side of trailer 250. Trailer mounted display 262 includes eight LEDs (i.e., high intensity light emitting diode modules) 263–270 vertically mounted on a narrow printed circuit board 275 encapsulated in a weather protective housing. Use of a printed circuit board as a signal interface unit allows the LEDs to be coupled via LED drivers to DVI 100 by a data bus rather than individual wires for each of the LEDs. In another embodiment, the trailer mounted display 262 includes eight marker lights mounted on an aluminum extrusion with individual activating lines to each marker light.

The trailer mounted display 262 is mounted on the side of trailer 250 with the LEDs 263–269 facing forward toward the tractor 251. It is mounted near the bottom of the trailer 250 such that it can be fully viewed in the left side mirror 254. The trailer mounted display 261 is mounted near the bottom of the trailer 250 such that it can be fully viewed in the right side mirror 253. Both trailer mounted displays 261, 262 are mounted on the sides of the trailer at a distance from the front end of the trailer 250 near the tractor 251 such that these displays 261, 262 can be easily viewed in mirrors 253, 254, respectively, when the vehicle is turning with an inside angle created between the tractor 251 and trailer 250 being as little as 120°.

For many trailers, the mounting of the displays 261, 262 is set at about 10' back from the front of the trailer. Additionally, the assembly housing for trailer mounted displays 261, 262 are resistant to contact with objects that normally do not cause collision damage such as small branches as the branches are slightly brushed by the trailer. Further, the housing does not break upon impact with stones, hail stones, sand, and other common debris found in roadways.

The trailer mounted displays 261, 262 can be included in a trailer based collision warning system that just uses rear sensors, that just uses side sensors (left side, right side, or both), or on a trailer based collision warning system that uses both rear sensors and side sensors. Although some applications only require a trailer mounted display on one side of the trailer, most applications will require a trailer display mounted on both sides of the trailer. The eight LED trailer mounted display 262 is configured with a status LED 270, a right turn indicator 269, five range LEDs 264-268, and a left turn indication 263. The various uses of the LEDs are associated with colors, where the status LED 270 is white, the right and left turn indicators 269, 263 are amber, and the range LEDs 264-268 are red. It is understood that other embodiments can use a different color coding for the light system used.

The white status LED 270 is a system status indicator located at the top of the mounting 275. In a normal state, where there are no malfunctions and no turn or reverse indications, the status LED 270 is off. When the right turn signal is on, the status LED 270 will be turned on and remain on in a steady manner, if there are sensors on the right side of the vehicle. When the left turn signal is turned on, the status LED 270 light will be turned on and remain on in a steady manner if there are sensors on the left side of the vehicle. When the vehicle is in reverse, or with flashers on in the flasher mode, the status LED 270 will be turned on and remain on in a steady manner, if there are sensors on the rear of the vehicle. When communications is lost with a sensor control unit, the status LED 270 flashes at a 4 Hz rate for 5 seconds and then turns completely off. Until communications are reestablished, the status LED 270 blinks at a 4 HZ for 1 second every 10 minutes. When communications with the sensor control unit are reestablished, the status LED 270 stays on continuously for 5 seconds and then extinguishes. If the system detects that rear ultrasonic sensors 241, 243 are not functioning correctly, but range is provided from the radar sensor 242, the status LED 270 is turned on and remains on for 750 ms and then turns off for 250 ms. This on-off pattern continues as long as there are objects detected by the radar sensors that should be detected by the ultrasonic sensors. Signals to the trailer mounted displays 261, 262 are provided by DVI 100.

The red range LEDs 264-268 provide range information regarding a potentially hazardous object. These range LEDs 264-268 can be configured in several ways. In one embodiment of the present invention, LED 269 can be used to indicate side object detection, while the bottom five range LEDs 268-264 can be used to provide rear range information. Additionally, the space between LEDs 269 and 268 can be different than for LEDs 268 thru 263 providing additional distinction between side and rear information. Each range LED when activated provides two sets of range information, one set associated with the LED on in a steady manner and the other set associated with the LED on in a flashing manner. In another embodiment, all five red range LEDs can be used to provide ranging information for one of the three directions: reverse, right turn, and left turn. With five LEDs having two settings, either steady on or flashing, up to 10 ranges for the presence of an object can be displayed. If the trailer is moving forward and an object is detected on the right side, LED 269 will be on if the right turn signal is active. If the trailer is moving backward and an object is detected at close range on the right side, LED 269 will turn on even though the right turn signal is not active. If the trailer is moving forward and an object is detected on the left side, LED 263 will be on if the left turn signal is active. If the trailer is moving backward and an object is detected at close range on the left side, LED 263 will turn on even though the right turn signal is not active. If a hazard condition is detected while the trailer is backing up, all the LEDs will flash. In this case, no right or left turn object detection is displayed. The rear hazard indication, which is only active when the trailer is moving in reverse, overrides both a right and a left turn indication.

FIG. 6 depicts a trailer mounted display 262 having six LEDs 291–296 mounted on a vertical strip 290. LED 296 is an white status LED mounted at the top of the vertical strip 290, and operates as described above. LED 295 is an amber indicator which turns on if an object is detected on the right or left side with the right or left turn signal is active or the vehicle is backing up. As an option an additional indicator could be added to differentiate left and right side alarms. The four red LEDs 294–291 are for rear range information, indicating the range to the nearest object detected to the rear of the trailer, when the trailer is in reverse. If the tractor-trailer has no reverse indicator, the four-way flasher can be turned on to activate the rear detection system. The ranging information for the LEDs of FIG. 6 is provided in the following table:

| Visual Feedback Table | |
| --- | --- |
| Condition | Visual Feedback |
| Object detected at rear with range greater than 25' | 291, 292, 293, 294 off |
| Rear detection in range of 12' to 25' | 294 on (no flashing) |
| Rear detection in range of 8' to 12' | 294 flashing at 2 Hz |
| Rear detection in range of 5' to 8' | 294 on, 293 on |
| Rear detection in range of 3' to 5' | 294 on, 293 on flashing at 2 Hz |
| Rear detection in range of 2' to 3' | 294 on, 293 on, 292 on flashing at 2 Hz |
| Rear detection in range of 1' to 2' | 294 on, 293 on, 292 on, 291 flashing at 2 Hz |
| Rear detection in range less than 1' | All lights 291 through 294 flashing at 4 Hz |
| Hazard: Sudden change in the range to detected object behind the vehicle (as might be expected if a person or vehicle were to suddenly move behind the vehicle) | 291 through 295 all flashing at 4 Hz |
| Rear sensor assembly malfunction | 296 flashing at 4 Hz |
| Object detected within 8 feet to the side of the vehicle while moving forward | 295 on depending on left or right turn signal being active (i.e. turned on) |
| Object detected within a programmable range of 6" to 2' to the side of the vehicle while backing up. | 295 on |

Hazard definition and visual alarm indicators are programmable. The above table represents default parameters that can be easily changed to suit the needs of a specific application or a specific customer.

Figure 7:
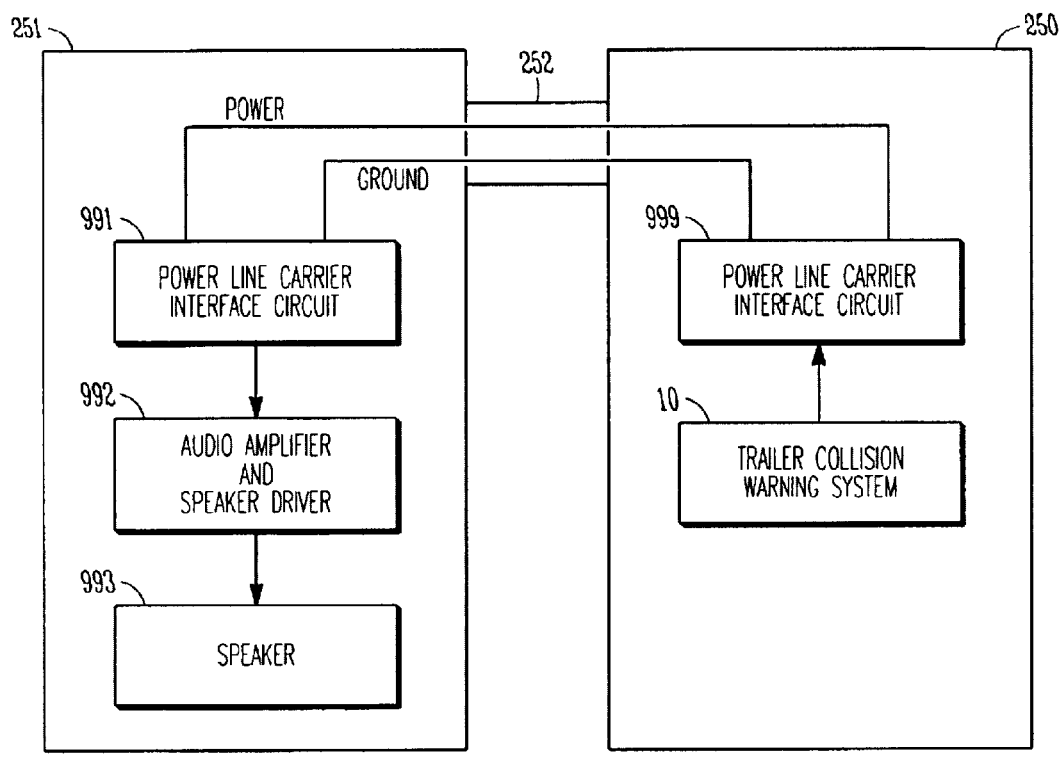
FIG. 7 depicts a block diagram for a trailer based collision warning system having information signals superimposed on existing tractor-trailer wiring for providing signals for audible use by external systems, in accordance with the present invention.

FIG. 7 depicts a block diagram for an audio warning system with information signals superimposed on existing battery power wires providing signals for audible use by external systems or accessories, in accordance with the present invention. An audio alarm enable signal is provided by the trailer based collision warning system 10 to a power line carrier interface circuit 999 which is coupled to existing battery wiring running in the cable 252 between the tractor and trailer. In particular, power line carrier interface circuit 999 is coupled to DVI 100 of trailer based collision warning system 10. The power line carrier interface circuit adheres to the standards for power line carrier technology for superimposing information signals on a power line. Within tractor 251 is a power line carrier interface circuit 991 for recovering the information superimposed on the power line. The power line carrier interface circuit 991 is coupled to the seven wire cable 252, or other tractor-trailer cabling scheme, and adheres to the standards for power line carrier technology for receiving signals superimposed on a power line. The information signals recovered by the power line carrier interface 991 are converted to signals for an audio amplifier and speaker driver system 992, which provides the signals for the speaker 993. The audio tones as provided by the speaker 993 for warning and range information are those described earlier in relation to the DVI, which controls the activation of audio signals. Alternately, other information can be provided by signaling over the seven wire cable 252 providing information on the status of the trailer based collision warning system, hazard locations on the right side, left side, and rear of the trailer, and relative ranging information regarding the hazard locations.

The power line carrier interface 999 is mounted on the trailer 250 in relatively close proximity to the trailer based collision warning system 10, or can be coupled to the trailer network provided by bus system 280. Power line carrier interface 991, the audio amplifier and speaker driver system 992, and speaker 993 are mounted in the tractor 251. These units can provide audio signals other than tones when configured with circuitry or programming to provide audible information regarding left, right, rear, malfunction status, on/off status, and distance information such as a number of feet. Providing such circuitry or programming should be understood by those skilled in the art. Alternately, the audio unit components for the tractor 251 can be provided as a portable unit. Additionally, information can be transferred using the power line carrier interfaces 999, 991 to an information display unit that may be part of or controlled by the audio unit, and may include speaker driver system 992 and speaker 993 along with a visual display unit. The information display unit may include only a visual display unit depending on the application.

Figure 8:
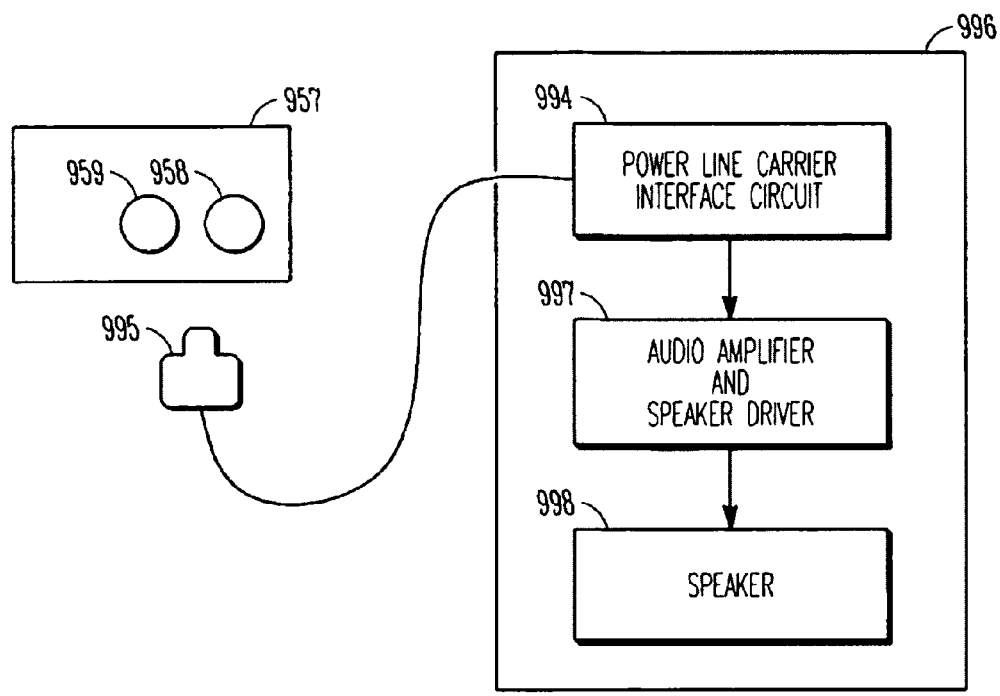
FIG. 8 depicts a portable audio receiver system for receiving warnings from a trailer based collision warning system, in accordance with the present invention.

FIG. 8 depicts a portable audio receiver system 996 for receiving warnings and range information from the trailer based collision warning system 10. The portable audio receiver system 996 includes a power line carrier interface circuit 994, an audio amplifier and speaker driver 997, speaker 998, and an audio pick-up device 995 adapted for coupling to a vehicle cigarette lighter outlet. These units can provide audio signals other than tones when configured with circuitry or programming to provide audio information regarding left, right, rear, malfunction status, on/off status, and distance information such as a number of feet. Providing such circuitry or programming should be understood by those skilled in the art. The audio pick-up device 995 is slotted into a cigarette outlet 958 in a tractor dash 957 for coupling to the tractor power line. Alternately, the audio device 995 can be coupled to a vehicle auxiliary power outlet 959. Additionally, information can be transferred using the portable audio receiver system 996 to an information display unit that may be part of or controlled by the audio unit, and may include speaker driver system 997, speaker 998 along with a visual display unit. The information display unit may include only a visual display unit depending on the application.

Figure 9:
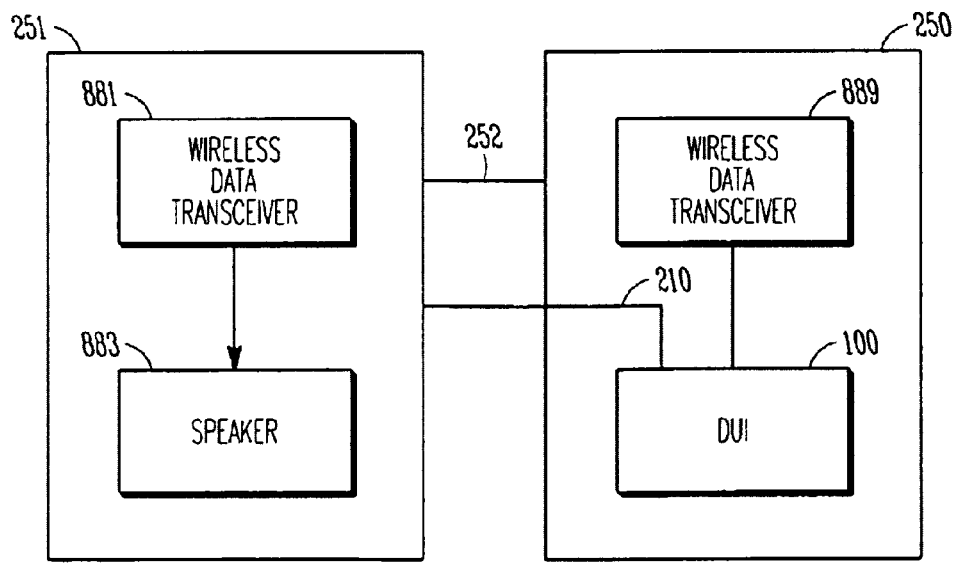
FIG. 9 depicts a trailer based collision warning system having information signals for audible use generated by a data transceiver in a trailer and received in the tractor, in accordance with the present invention.

FIG. 9 depicts a warning system for receiving an audio activation signal by a wireless data transceiver 881 in a tractor 251 that was transmitted from a wireless data transceiver 889 mounted on trailer 250 and coupled to DVI 100. DVI 100 receives information regarding collision warning and range information and passes it on to wireless data transceiver 889 which wirelessly transmits the information to the wireless data transceiver 881 in the tractor 251. In one embodiment, wireless transceivers 889, 881 are implemented in compliance with Bluetooth™ wireless technology standards (Trademark owned by Bluetooth Sig, Inc.). In another embodiment, the wireless transceivers 889, 881 adhere to IEEE 802.11 wireless standards. It can be understood by those skilled in the art that wireless data transceivers 889, 881 can be used in the present invention that adhere to a wide variety of industry accepted standards for wireless LAN systems. Wireless transceiver 889 receives its power from DVI 100 that is coupled to the standard seven wire cable 252 via lines 210 of FIG. 2. Alternately, the wireless transceiver receives its power by directly coupling into the standard seven wire cable 252. Further, audio information to be conveyed to the driver of tractor 251 has been described with respect to DVI 100 audio functions. The wireless transceiver 881 and speaker 883 can be mounted in the tractor 251. Alternately, a portable wireless transceiver can be used in the tractor 251. In addition to providing information for audio warnings, non-audio information received via wireless transceiver 881 can be diverted to an accessory device for visual display.

Figure 10:
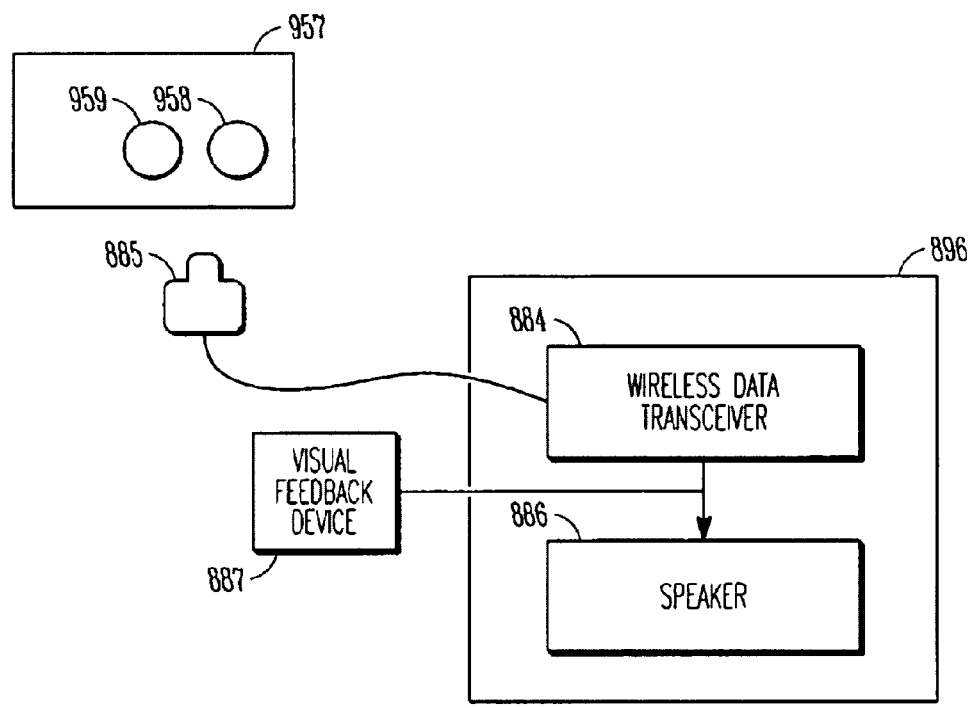
FIG. 10 depicts a portable audible driver feedback device for receiving warnings from a trailer based collision warning system, in accordance with the present invention.

FIG. 10 depicts a portable driver feedback device 896 for receiving audio warning and range information from the trailer based collision warning system 10. The portable driver feedback device 896 includes a wireless data transceiver 884, speaker 886, and a power adaptor 885 adapted for coupling to a vehicle cigarette lighter outlet. The power adapter 885 plugs into a cigarette outlet 958 in tractor dash 957 for coupling to the tractor power line. Alternately, the power adapter 885 can be coupled to a vehicle auxiliary power outlet 959. In addition to providing information for audio warnings, information for visual displays can be provided wherein portable driver feedback device 896 controls the conversion of information to a visual feedback device 887 or visual display.

Figure 11:
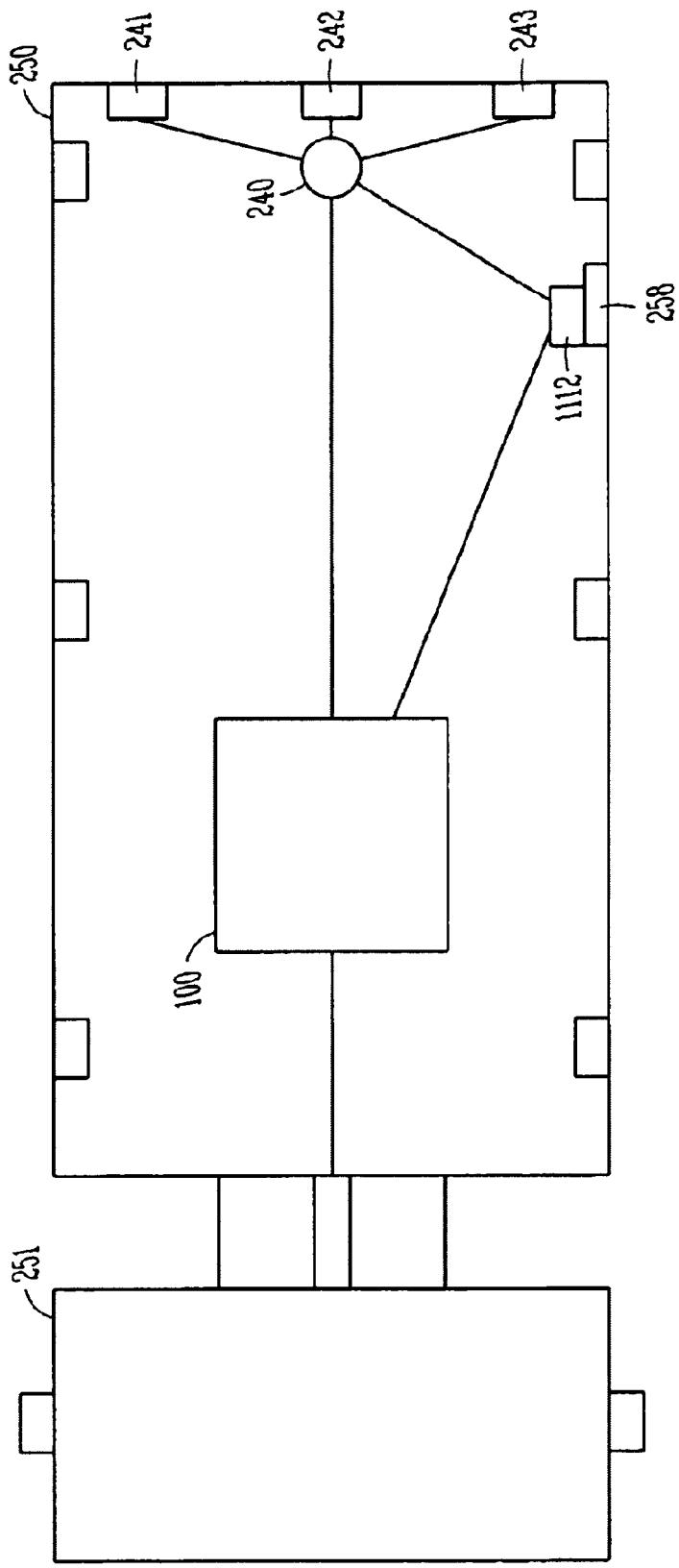
FIG. 11 depicts a reverse sensor mounted on an axle of a trailer for detecting direction of motion, in accordance with the present invention.

FIG. 11 depicts a reverse sensor 1112 mounted on or adjacent to an axle on trailer 250. Reverse sensor 1112 is a Hall effect sensor for providing information regarding the direction of motion of the trailer. Alternatively, reverse sensor 1112 can be coupled to the hub of a wheel 258 of trailer 250 to detect direction of motion of the trailer. The reverse sensor 1112 is used in conjunction with the rear sensors 241, 242, 243 to provide information when the trailer 250 is backing. Alternatively, the information from reverse sensor 1112 may be wired directly to DVI 100. Other sources for detecting backing information include driver activation of the four-way flashers, motion sensor detecting movement of the ground relative to the vehicle, or information received on an existing data bus between the tractor and trailer. The rear sensors may be active at all times or activated when the vehicle is backing up. In either case, range measurements and collision warnings from the rear sensors are enabled only when the rear sensors recognize (a) that the transmission is in reverse, (b) that the four-way flashers are activated, or (c) that the reverse sensor detects trailer motion in the reverse direction.

When range measurements and collision warnings from the rear sensors are enabled, an audible hazard alarm controlled by DVI 100 will automatically extinguish within 10 seconds after being activated. Rear range measurements are displayed when an object is detected within 10' of the rear of the trailer. When the trailer stops, the range data will continue to be displayed until (a) the vehicle begins to move forward, (b) the ignition switch is turned off, or (c) the range measurement has not changed for a specified period of time.

In another embodiment of the present invention, a method for indicating that a tractor-trailer is slowing down can be implemented with the trailer based collision warning system 10. The tractor-trailer 251–250 as depicted in FIG. 2 traveling in a forward direction can slow down using the transmission and engine without applying brakes. In this situation, no warning is displayed to the drivers behind the tractor-trailer 251–250. Using a Doppler radar sensor such as 242, or an alternate speed sensor the trailer based collision warning system can determine a sudden slowing down of the vehicle. When the slow down is detected, DVI 100 can apply a signal to the brake lights of the trailer 250 to indicate to other drivers that the tractor-trailer 251-250 is slowing down. DVI 100 continues to activate the brake lights until the vehicle stops moving, stops slowing down, or begins to speed up. These three conditions are detected by the sensors, which work in conjunction with DVI 100. Examples of alternate methods of detecting trailer speed include: (a) use of rear Doppler radar sensor, (b) Global Positioning System receiver, (c) sensor detecting rate of trailer tire or axle rotation, or (d) information received from an existing data bus on the tractor and connected to the trailer.

Figure 16:
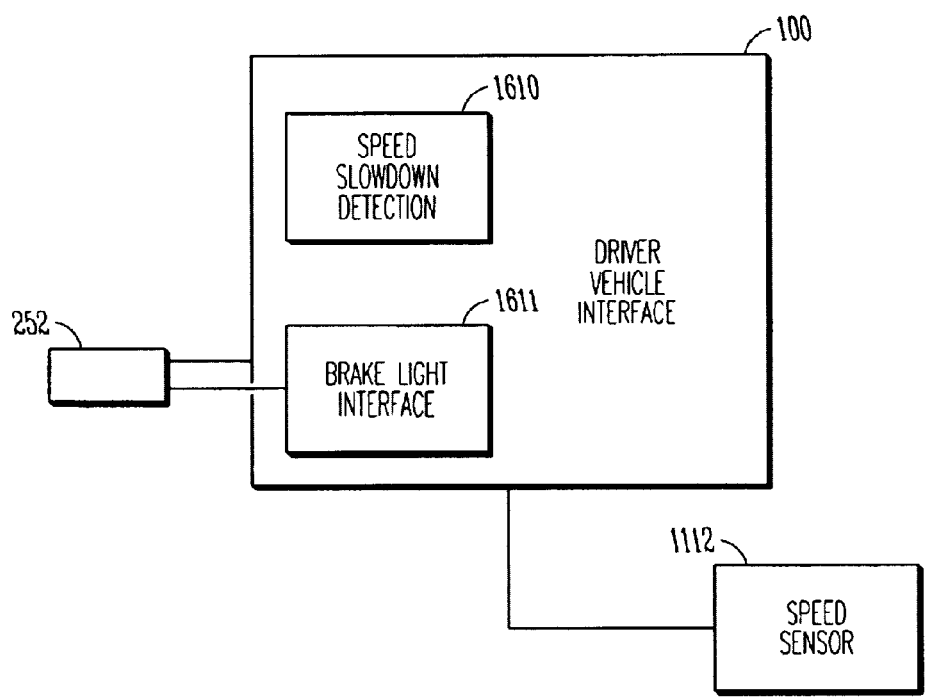
FIG. 16 depicts the elements for detection that a trailer is slowing down and for automatic activation of the trailer's brake lights, in accordance with the present invention.

FIG. 16 depicts DVI 100 with a means of detecting a condition in which the trailer is slowing down and electronically turning on the brake lights while this slowdown condition is present. In one embodiment, DVI 100 is coupled to speed sensor 1112 to receive signals for DVI 100 to determine a slowdown condition using speed slowdown detection 1610 capabilities within DVI 100. These capabilities can include software using information from speed sensor 1112. If speed slowdown detection 1610 determines a slowdown condition has occurred, DVI 100 can activate the trailer brakes using a brake light interface 1611 coupled to the brake light control line from the seven wire cable 252 coming from the tractor. Alternatively, the brake light interface 1611 may be included in the coupling from DVI 100 directly to the brake lights or to other standard tractor to trailer cabling.

Figure 12:
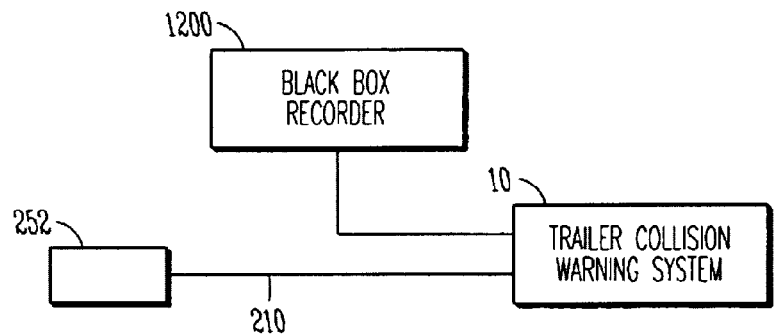
FIG. 12 depicts a black box recorder used in conjunction with a trailer based collision warning system, in accordance with the present invention.

FIG. 12 depicts a black box recorder 1200 used in conjunction with the trailer based collision warning system 10 to record trailer information leading to a collision. The data measured with sensors may either be collected by DVI 100 and provided to the black box recorder by DVI 100 or may be received directly from the sensors via data bus 280. The information collected for storage in the black box recorder includes such data as (a) the range to all objects in proximity to the trailer, (b) the relative speed of objects in close proximity to the trailer, and (c) the location of each object in proximity to the trailer relative to the trailer itself. The information is stored in memory. This memory maintains a record, in non-volatile memory, of data pertinent to system operation, vehicle operation, and obstacle detection. Parameters related to long periods before an accident are stored along with parameters related to about the last two minutes leading up to an accident. Data continues to be stored in black box recorder memory until (a) a G-force switch detects a sudden impact, (b) a rollover sensor detects that the vehicle has turned on its side or back, or (c) the ignition is turned off.

Figure 13:
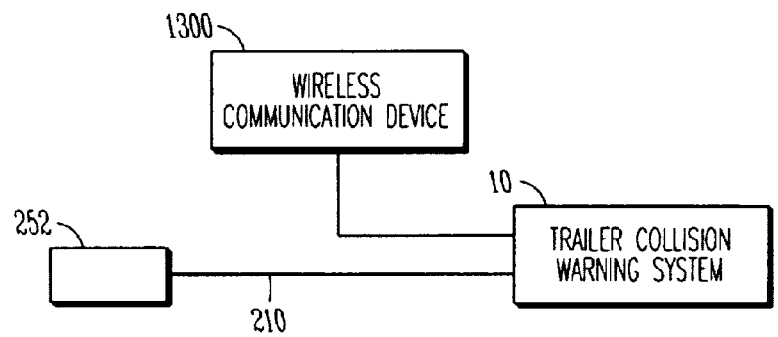
FIG. 13 depicts a wireless communication system used in conjunction with a trailer based collision warning system, in accordance with the present invention.

FIG. 13 depicts a wireless communication system (WCS) 1300 used in conjunction with the trailer based collision warning system 10. The WCS 1300 communication technology may be cellular, satellite, or other form of two-way vehicle to land-based wireless data communication. Data collected on the status of a trailer by the trailer based collision warning system can be communicated to the trailer owner by WCS 1300. The WCS 1300 has a transmitter and receiver. The WCS 1300 may be activated based on a wireless message received by the trailer fleet owner or may be activated based on signals received from the trailer-based collision warning system. Status information pertinent to driver performance, near-accident data, or actual accident data may be stored in a black box recorder, in DVI 100, or the WCS 1300 and transmitted to the trailer fleet owner on demand, at specific time intervals, or based on certain events (such as an accident). In another embodiment of the present invention, the WCS includes a system processor, memory, a transmitter, and a receiver. Further, the WCS may include a battery source to be used when the trailer is not coupled to a tractor.

In another embodiment of the present invention, the sensors of the trailer based collision warning system in combination with door sensors and vehicle movement sensors are used to provide a security system for the trailer. When the trailer is parked and the security mode is activated, the trailer based collision warning system can operate in any combination of three security modes, including: (a) alarm based on the opening of trailer doors or fluid valve; (b) movement of the trailer; and (c) movement of persons in close proximity to the trailer for a pre-programmed period of time.

Figure 14:
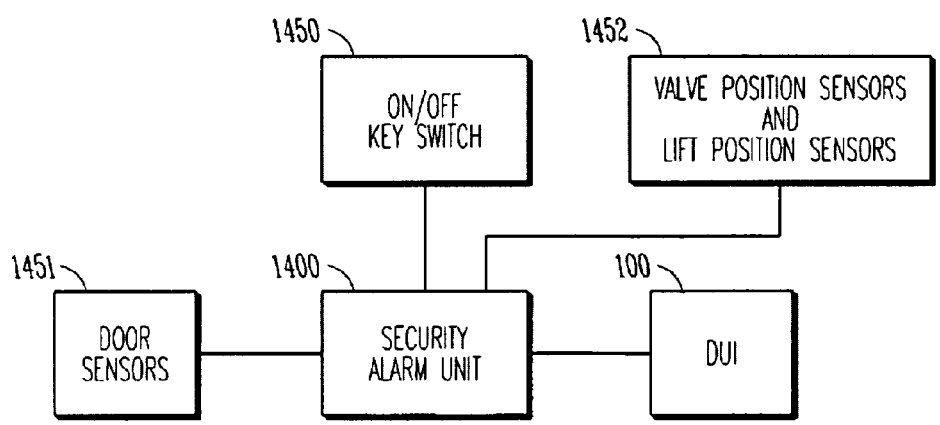
FIG. 14 depicts a block diagram of elements for a trailer based security alarm system.

FIG. 14 depicts a block diagram of components of a security system for a trailer including a security alarm unit 1400, door sensors 1451, valve sensors 1452, and an on/off key switch 1450 to be mounted on the trailer. Valve sensors 1452 includes valve position sensors and lift position sensors. Security alarm unit 1400 is coupled to DVI 100 for controlling the sensors mounted on the trailer in a security alarm mode. When the security mode is activated by a key switch 1450 mounted on the side of the trailer, the trailer based collision warning system goes into a low-power mode whereby the sensors are turned on for short periods of time. When activated, door sensors 1451 are enabled to detect doors that have opened and valve position sensors 1452 are enabled to detect fluid valves that have opened. Value position sensors, such as 1452, are useful with tanker trailers containing products such as processing gases and petroleum products. Value position sensor 1452 can also be used in a security mode to provide a warning when there is an unauthorized opening of the value to the fluid products of a trailer, or when the value is open with the trailer in motion. Additionally, lift position sensors 1452 can provide an indication that the hydraulics of the trailer have been engaged such that the trailer is in a lift position. This indication can be used to prevent the trailer from being moved with the lift in any position other than its normal configuration for traveling.

In addition, when activated, radar sensors are enabled to detect movement of the trailer indicative of a trailer hijacking in progress, and radar sensors detect continuous movement of objects within short distances of the sides and rear of the trailer for a preprogrammed time such as two minutes. The preprogrammed time is to prevent false alarms from an occasional situation where someone passes the vehicle. If a security violation is detected, a high volume audible alarm will turn on for 30 seconds and off for five minutes until the security violation goes away or the key switch on the side of the trailer is turned off. The on/off time intervals for the audible alarm can be programmably changed to meet the requirements of a specific customer. In another embodiment of the present invention, a security violation can be reported to local officials or fleet headquarters through the wireless communication system 1300.

Figure 15:
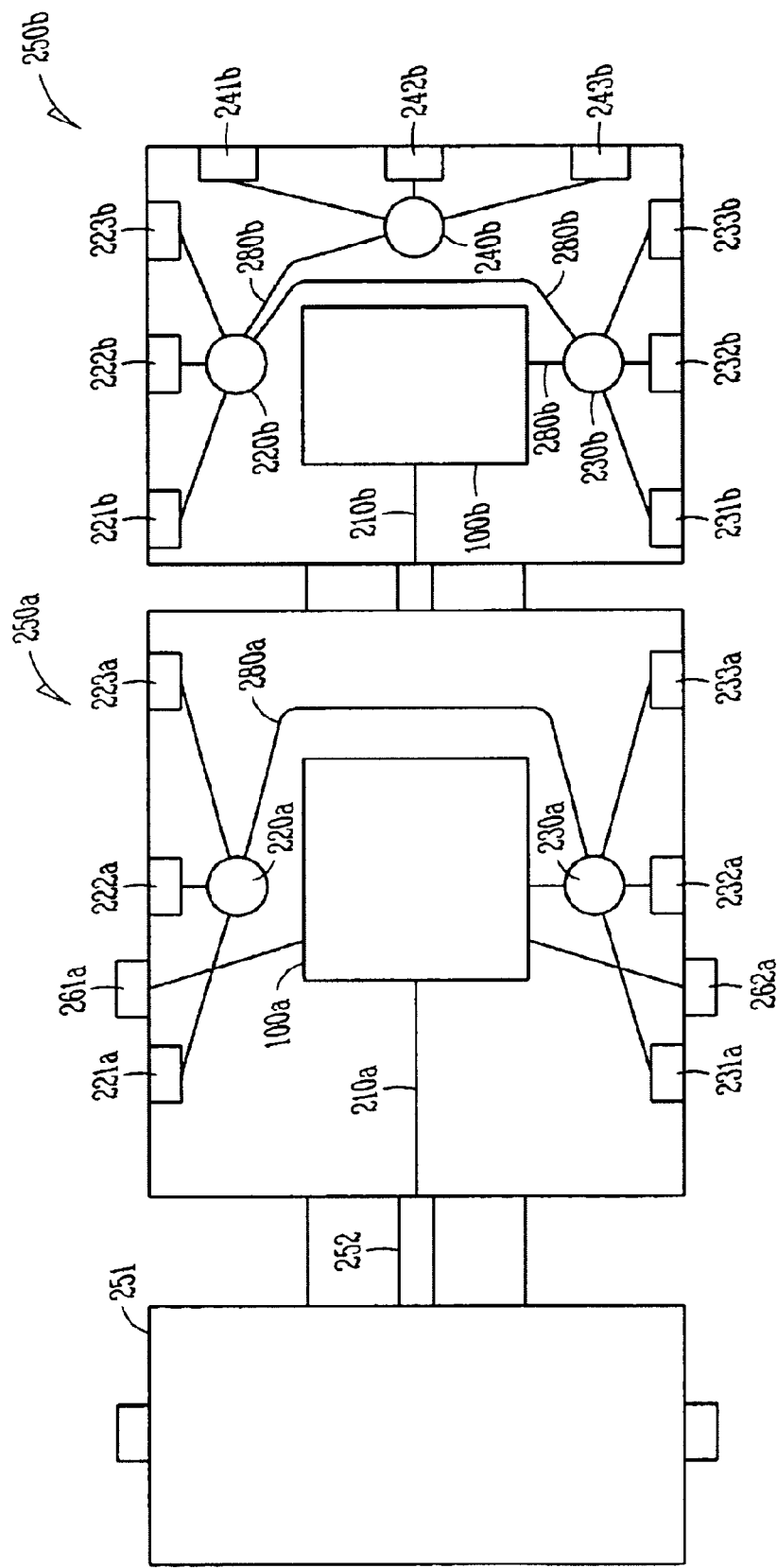
FIG. 15 depicts a truck having a tractor coupled to two trailers with a trailer based collision warning system mounted on each trailer, in accordance with the present invention.

FIG. 15 depicts a tractor 251 pulling trailer 250*a* coupled with 250*b*, commonly known as tandem trailers. Each trailer 250*a*, 250*b* has side sensors 221*a,b*–223*a,b* controlled by sensor control units 220*a,b* respectively, and side sensors 231*a,b*–233*a,b* controlled by sensor control units 230*a,b* respectively. Rear sensors 241*b*–243*b* are mounted on trailer 250*b* with no corresponding sensors on trailer 251*a*, as these sensors if mounted would detect 250*b*. DVI 100*a* and DVI 100*b* are coupled together by superimposing signals on the vehicle battery power wiring of the two trailers 250*a,b* contained in the standard seven wire cable 252*b* using power line carrier interface circuitry. In addition power and turn signal indicators are passed through the seven wire cable 252*b* for use by DVI 100*b*. Alternately, DVI 100*a* can communicate with DVI 100*b* using wireless technology. An alarm unit is coupled to DVI 100*a* such that control of the visual signals is handled by DVI 100*a* with the signals displayed on 261*a* and 262*a*. Audio signals are controlled by DVI 100*a* as discussed earlier.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is intended that this invention be limited only by the claims and the equivalents thereof.

What is claimed is:

1. A trailer based collision warning system comprising:
   a sensor;
   a sensor control unit coupled to the sensor, the sensor control unit having a signal processor to determine a presence of a hazard and a controller to control multiple sensors, the sensor control unit capable of determining an object within a predetermined field of view for each sensor coupled thereto, and within a predetermined detection range;
   a driver vehicle interface coupled to the sensor control unit, the driver vehicle interface configured to receive signals from the sensor control unit representative of objects determined by the sensor control unit;
   an alarm unit coupled to the driver vehicle interface capable of providing a representation of objects detected by the sensor control unit, wherein the trailer based collision warning system is adapted for mounting to a trailer; and
   a security feature built into the driver vehicle interface that utilizes existing collision warning sensors of one or more types along with additional sensors capable of determining alarm conditions, wherein the alarm conditions include unauthorized opening of trailer doors, unauthorized opening of fluid valves, unauthorized movement of the trailer, and movement of persons in close proximity to the trailer for a preprogrammed period of time.

2. The trailer based collision warning system of claim 1, wherein the security alarm unit has a security mode activated with a key switch mounted on the side of the trailer.

3. The trailer based collision warning system of claim 2, wherein when an alarm condition is detected, a high volume audible alarm is sounded for a period of approximately 30 seconds once every five minutes until the alarm condition is eliminated or the key switch mounted on the side of the trailer is turned off, the audible alarm on/off periods of time being programmable.

4. The trailer collision warning system of claim 1, further including a wireless communication system coupled to the security alarm unit, wherein the security alarm unit upon determining an alarm condition automatically activates the wireless communication system to transmit a security alarm code to a land-based terminal.

5. A trailer based collision warning system comprising:
   a first sensor control unit having at least one sensor coupled thereto, the first sensor control unit having a first signal processor to determine a presence of a hazard and a first controller to control multiple sensors, the first sensor control unit capable of determining an object within a predetermined field of view for each sensor coupled thereto, and within a predetermined detection range;
   a first driver vehicle interface coupled to the first sensor control unit, the first driver vehicle interface configured to receive signals from the first sensor control unit representative of objects determined by the first sensor control unit;
   a second sensor control unit having at least one sensor coupled thereto, the second sensor control unit having a second signal processor and a second controller to control multiple sensors, the second sensor control unit capable of determining an object within a predetermined field of view for each sensor coupled thereto, and within a predetermined detection range;
   a second driver vehicle interface coupled to the second sensor control unit, the second driver vehicle interface configured to receive signals from the second sensor control unit representative of objects determined by the second sensor control unit, the second driver vehicle interface coupled to the first driver vehicle interface;
   an alarm unit coupled to the first driver vehicle interface capable of providing a visual representation of objects determined by the first and second sensor control units, wherein the trailer based collision warning system is adapted for mounting to a trailer.

6. The trailer based collision warning system of claim 5, wherein the predetermined detection range is programmable for each sensor.

7. The trailer based collision warning system of claim 5, wherein the system includes:
   a sensor to determine the speed of the trailer,
   a detector to determine that the trailer is slowing down, and
   a brake light interface to activate the brake lights on the trailer when the trailer is slowing down.

8. The trailer based collision warning system of claim 5, wherein the first driver vehicle interface and the first sensor control unit perform a built-in test function, and the second driver vehicle interface and the second sensor control unit perform a built-in test function each time power is applied to the trailer based collision warning system and continue to perform built-in test functions while the trailer based collision warning system is in operation, and wherein a malfunction in the trailer based collision warning system is reported by the first driver vehicle interface through the alarm unit.

9. The trailer based collision warning system of claim 5, wherein the first sensor control unit, the first driver interface unit and the alarm unit are adapted for mounting to a first trailer, wherein the second sensor control unit, and the second driver interface unit are adapted for mounting to a second trailer when the first trailer and the second trailer are coupled together.

10. The trailer based collision warning system of claim 9, wherein the first driver interface unit is coupled to the second driver interface unit by a tractor trailer cable coupled between the first trailer and the second trailer used to provide power and turn indications with additional signals passed between the first and second driver interface units using power line carrier interface circuits coupled to the vehicle battery power wiring.

11. The trailer based collision warning system of claim 5, wherein the first driver vehicle interface communicates with the second driver vehicle interface using wireless data transceivers mounted in each driver vehicle interface.

12. The trailer based collision warning system of claim 1, wherein the predetermined detection range is programmable for each sensor.

13. The trailer based collision warning system of claim 1, wherein the system includes:
a sensor to determine the speed of the trailer,
a detector to determine that the trailer is slowing down, and
a brake light interface to activate the brake lights on the trailer when the trailer is slowing down.

14. The trailer based collision warning system of claim 1, wherein the driver vehicle interface and the sensor control unit perform a built-in test function each time power is applied to the trailer based collision warning system and continue to perform built-in test functions while the trailer based collision warning system is in operation, and wherein a malfunction in the trailer based collision warning system is reported by the driver vehicle interface through the alarm unit.

15. The trailer based collision warning system of claim 1, wherein the driver interface unit includes a processor and memory for directing the sensor control unit, receiving information from the sensor control units, and controlling the alarm unit.

16. The trailer based collision warning system of claim 1, wherein the alarm unit includes units capable of providing visual and audio representations of objects determined by the sensor control unit.

17. The trailer based collision warning system of claim 1, further including a direction of motion sensor to provide direction information to the sensor control units or the driver vehicle interface.

18. The trailer based collision warning system of claim 17, wherein the direction of motion sensor is adapted for sensing the direction of rotation of a trailer axle or a trailer wheel.

19. The trailer based collision warning system of claim 17, wherein the direction of motion sensor is a Hall effect sensor.

20. The trailer based collision warning system of claim 1, further including a black box recorder coupled to the driver vehicle interface for recording information about the trailer.

21. The trailer based collision warning system of claim 20, further comprising a G-Force switch coupled to the black box for detecting a collision, and a rollover sensor coupled to the black box for detecting a rollover condition, wherein the recording of information is automatically terminated by a collision or by a rollover condition.

22. The trailer based collision warning system of claim 20, wherein the information recorded includes status of the trailer based collision warning system, status of individual components of the trailer based collision warning system, and location and rate of closure information for all objects near the trailer.

23. The trailer based collision warning system of claim 20, wherein the information recorded includes information recorded for a predetermined period of time before a collision.

24. The trailer based collision warning system of claim 23, wherein the predetermined period of time is programmably set in the black box recorder.

25. The trailer based collision warning system of claim 23, wherein the predetermined period of time for which information is stored before a collision is about four minutes.

26. The trailer based collision warning system of claim 1, further including a wireless communication system coupled to the driver vehicle interface capable of transmitting and receiving information related to the trailer to which the trailer based collision warning system is mounted.

27. The trailer based collision warning system of claim 26, wherein the information transmitted by the wireless communication system includes status of the trailer based collision warning system, status of individual components of the trailer based collision warning system, driver performance information, near-accident data, or actual accident data.

28. The trailer based collision warning system of claim 27, wherein the wireless communication system is configurable for transmitting the information to a predetermined location on demand, at specific time intervals, or based on predetermined events.

29. The trailer based collision warning system of 27, wherein the information is stored in the memory of the driver vehicle interface or in a black box recorder coupled to the driver vehicle interface.

30. The trailer based collision warning system of 26, wherein the wireless communication system includes a processor and memory for storing information related to the trailer, driver performance, near-accident data, or actual accident data.

* * * * *